United States Patent
Hosier et al.

(10) Patent No.: US 8,331,738 B2
(45) Date of Patent: Dec. 11, 2012

(54) REDUCING BUFFER SIZE REQUIREMENTS IN AN ELECTRONIC REGISTRATION SYSTEM

(75) Inventors: Paul A. Hosier, Rochester, NY (US); Jess R. Gentner, Rochester, NY (US); Kenneth R. Miller, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 461 days.

(21) Appl. No.: 12/730,347

(22) Filed: Mar. 24, 2010

(65) Prior Publication Data

US 2011/0235946 A1  Sep. 29, 2011

(51) Int. Cl.
G06K 9/00  (2006.01)

(52) U.S. Cl. ........ 382/309; 382/275; 382/289; 375/278; 375/285; 358/444; 399/395; 400/579; 348/95

(58) Field of Classification Search .................. None
See application file for complete search history.

(56) References Cited

U.S. PATENT DOCUMENTS

| | | | |
|---|---|---|---|
| 3,154,762 A * | 10/1964 | Morphet, Jr. | 360/26 |
| 5,153,608 A * | 10/1992 | Genovese | 347/256 |
| 5,218,405 A * | 6/1993 | Wong | 399/117 |
| 5,274,394 A | 12/1993 | Corona et al. | |
| 5,374,993 A | 12/1994 | Diehl et al. | |
| 5,381,165 A * | 1/1995 | Lofthus et al. | 347/232 |
| 5,493,326 A | 2/1996 | Andrews et al. | |
| 5,732,162 A * | 3/1998 | Curry | 382/294 |
| 5,760,914 A | 6/1998 | Gauthier et al. | |
| 5,942,745 A * | 8/1999 | Kline et al. | 250/208.1 |
| 6,310,695 B1 | 10/2001 | Gauthier et al. | |
| 6,456,394 B1 | 9/2002 | Gwaltney et al. | |
| 6,519,055 B1 * | 2/2003 | Curry et al. | 358/2.1 |
| 6,529,643 B1 * | 3/2003 | Loce et al. | 382/300 |
| 6,903,758 B1 | 6/2005 | Kerxhalli et al. | |
| 6,940,536 B2 | 9/2005 | Rauch et al. | |
| 7,145,699 B2 * | 12/2006 | Dolan | 358/452 |
| 7,305,112 B2 * | 12/2007 | Curry et al. | 382/133 |
| 7,420,719 B2 * | 9/2008 | Mongeon | 358/504 |
| 7,991,244 B2 * | 8/2011 | Youngers et al. | 382/289 |
| 8,169,657 B2 * | 5/2012 | Wang et al. | 358/1.5 |
| 2003/0175602 A1 | 9/2003 | Kazaa | |
| 2004/0114831 A1 * | 6/2004 | Notovitz et al. | 382/296 |
| 2006/0092264 A1 | 5/2006 | Matsuzaki et al. | |
| 2007/0165283 A1 | 7/2007 | Matsuzaki et al. | |
| 2008/0266619 A1 | 10/2008 | Ang et al. | |
| 2009/0034007 A1 | 2/2009 | Sano et al. | |
| 2009/0252437 A1 * | 10/2009 | Li et al. | 382/289 |
| 2011/0235946 A1 * | 9/2011 | Hosier et al. | 382/309 |

* cited by examiner

*Primary Examiner* — John Lee
(74) *Attorney, Agent, or Firm* — Philip E. Blair; Fleit Gibbons Gutman Bongini & Bianco P.L.

(57) ABSTRACT

What is disclosed is a novel system and method for reducing a size of a memory buffer used by an electronic registration correction system performing an electronic registration correction on a digital image. The present method uses column address segmentation to identify blocks of scanlines within a spatially mapped array of image pixels comprising a digital image. Advantageously, the present system and method reduces scanline buffer memory by a factor of $2^{n-1}$, where n is the number of column address segments. Buffering can be performed at almost any upstream location in the image path. The present method is well suited for high resolution imaging equipment where memory is constrained by design, cost, or space limitations.

14 Claims, 11 Drawing Sheets

REDUCING BUFFER SIZE REQUIREMENTS IN AN ELECTRONIC REGISTRATION SYSTEM

TECHNICAL FIELD

The present invention is directed to systems and methods which reduce a size of a memory buffer required by an electronic registration system performing an misregistration error correction on a digital image.

BACKGROUND

A Raster Output Scanner (ROS), as is well known in the document reproduction arts, outputs a digital image onto a photoreceptive surface. Operationally, the ROS repeatedly scans a modulated beam over the photoreceptor surface in accordance with a predetermined pattern of an image. A conventional ROS typically includes a laser diode to generate the light beam that is modulated in response to received data and a rotating polygonal mirror to reflect the modulated beam across the photoreceptor surface as the photoreceptor surface is advanced. Each scan typically traces a single scanline across the photoreceptor surface in a direction that is substantially normal to the movement of the photoreceptor. Variations, for instance, in the angular speed of the rotating polygonal mirror, as well as variations in the geometry of the sidewalls or facets of the polygonal mirror, can distort the trajectory of the beam scan. Such distortions are known in this art as bow and skew.

Attention is directed to prior art FIG. 11A which shows a well-known basic configuration of a scanning system used, for example, in an electrophotographic printer or facsimile machine. Laser source 1110 produces a collimated laser beam 1112 which is reflected from the facets of a rotating polygon 1114. The polygon surface deflects the laser beam to direct a line of beam scanning 1116 toward the photoreceptor 1118. When the line of beam scanning 1116 reaches the photoreceptor, a scanning line 1120 results across the photoreceptor. The periodic scanning of beam 1116 across the rotating receptor creates a raster, or array of scan lines, on the photoreceptor, creating the desired image to be printed. Such a configuration typically includes any number of lenses and mirrors to accommodate a specific design. Unavoidable imprecisions in the shape and/or mounting of these optical elements will inevitably introduce certain anomalies in the quality of the scan line on the photoreceptor, and consequently create flaws in the printed document. Two important types of such anomalies are "skew" and "bow." Skew is the error in rotational orientation of scan lines relative to the photoreceptor. As shown in FIG. 11, the scan line 1120 is rotated slightly relative to a line 1122, which is parallel with the axis of the photoreceptor 1118. If the photoreceptor is a plate or belt, the scan line may be skewed relative to an important base line, such as a line perpendicular to the edge of the belt. Further, if a number of rasters are superimposed on a document, as in a color copier, the different skews of the different rasters will cause a noticeable interference pattern on the document, to the great detriment of copy quality. Bow is the quality of a scan line to form not a straight line on the photoreceptor, but a line which bows about a central midpoint. An example of bow is shown by scan line 1120' in FIG. 11B. Even in a monochromatic printer, a pronounced bow of the lines in a raster will be noticeable. In a color printer or copier, the different extent and/or direction of bow for each superimposed color raster can be an important cause of a conspicuous color banding on the document. Depending on the types of imprecision in the construction of the apparatus, the bow may bend in either direction relative to the center line 1122. In manufacturing situations, it is also very common to have both skew and bow simultaneously evident in the scan line 1120.

To eliminate such distortions the beam scan trajectory must be within relatively tight tolerances, for example, ±5μ. Tolerances on a micron level are difficult to achieve solely by opto-mechanical means. As such, electronic registration systems to compensate for skew and bow errors have been introduced in this art. Electronic registration systems manipulate the image data such that the resulting output image contains no such beam scan trajectory distortions, or such distortions have otherwise been minimized to a visually acceptable level. Electronic registration (ER) systems save cost over opto-mechanical means.

However, ER systems in document reproduction devices capable of high speed, high volume reproduction require expensive high speed buffers sufficiently large enough to store enough of the image data to span the range of the bow and skew error such that the distortions in the beam scan trajectory can be corrected or otherwise compensated for. For example, in system capable of 2400 dots-per-inch resolution (1 bit/pixel) and having a beam scan trajectory distortion of 2 millimeter across the trajectory path, a total of 189 full width scanlines of image data need to be buffered for correction. This approximates to 5.6 Mbits or ≈100 high speed buffers per millimeter of compensation. Such a large buffer is expensive and moreover greatly increases onboard or on-chip requirements to handle such a buffer size. If the buffering required by an ER system sufficient to compensate for a sufficiently large amount of skew and bow is large, the hardware requirements, in terms of FPGA, ASIC, and the like, as are common in ER systems, can become cost prohibitive. Since high speed buffers quickly become prohibitive from a cost and space-constraint perspective, systems and methods are needed in this art which reduce scanline buffer size requirements in many electronic registration applications.

Accordingly, what is needed in this art are increasingly sophisticated systems and methods which reduce on-board or on-chip memory buffer size requirements in electronic registration systems correcting for beam scan trajectory distortions in a digital image.

INCORPORATED REFERENCES

The following Patents, Patent Applications, and Publications are incorporated herein in their entirety by reference.

"Image Forming Method", U.S. Patent Publication No. 2003/0175602, to Kazama.

"Image Forming Apparatus And Image Forming Method", U.S. Patent Publication No. 2006/0092264, to Matsuzaki, et al.

"Image Forming Apparatus, Image Processing Method Thereof, Storage Medium Storing Program for Image Processing", U.S. Patent Publication No. 2007/0165283, to Matsuzaki, et al.

"Image Forming Apparatus And Image Correction Method", U.S. Patent Publication No. 2009/0034007, to Matsuzaki, et al.

"Image Quality Adjustment Method And System", U.S. Patent Publication No. 2006/0244980, to Grace.

"Image Forming Apparatus, Image Processing Method Thereof And Storage Medium Storing Program For Image Processing", U.S. Patent Publication No. 2007/0165283, to Matsuzaki, et al.

"Optical Scanner With Non-Redundant Overwriting", U.S. Patent Publication No. 2008/0266619, to Ang et al.

"Skew And Bow Correction System For An Image Scanner", U.S. Pat. No. 5,153,608, to Genovese.

"Apparatus And Method For Cleaning A Donor Roll", U.S. Pat. No. 7,010,239, to Gross et al.

"Electronic Adjustment Of Slow Scan Image Registration In An Image Recording Apparatus", U.S. Pat. No. 5,274,394, to Corona et al.

"Image Skew Adjustment For A Raster Output Scanning (ROS) System", U.S. Pat. No. 5,374,993, to Diehl et al.

"Raster Output Scanner With Process Direction Registration", U.S. Pat. No. 5,381,165, to Lofthus et al.

"Method And Apparatus For Scan Line Skew Correction Using A Gradient Index Electrooptic Prism", U.S. Pat. No. 5,493,326, to Andrews et al.

"Two Dimensional Linearity And Registration Error Correction In A Hyperacuity Printer", U.S. Pat. No. 5,732,162, to Curry.

"System For Electronic Compensation Of Beam Scan Trajectory Distortion", U.S. Pat. No. 6,529,643, to Loce et al.

"Method For Maintaining Image Squareness And Image On Image Registration", U.S. Pat. No. 6,903,758, to Kerxhalli et al.

"System Architecture For Scan Line Non-*Linearity Compensation In A ROS System*", U.S. Pat. No. 6,940,536, to Rauch et al.

BRIEF SUMMARY

What is disclosed is a novel system and method for reducing a size of a memory buffer used by an electronic registration correction system performing an electronic registration correction on a digital image. As will become apparent herein further, the present system and method reduces scanline buffer requirements by a factor of $2^{n-1}$, where n is a number of column address segments of a spatially mapped array of a digital image. Advantageously, the present method can be performed at a variety of any upstream locations in the image path. The present method also finds its uses in a variety of diverse applications and is well suited for use with a variety of high resolution imaging equipment where a size of a high speed memory buffer is constrained by cost, space, or other design limitations.

In one example embodiment, the present method for electronic registration correction involves the following. First, a page of a digital image requiring electronic registration correction is received. The page comprises a spatially mapped array having rows of column blocks. A size of a block is defined such that a maximum coarse skew error in a given block is less than a number of rows of scanlines within that block. Each column block contains rows of scanlines. Each scanline comprises a row of pixel locations. Each pixel location has an associated address comprised of address segments. In one embodiment hereof, the row address segment identifies a particular row of column blocks within the spatially mapped array. The column address segment identifies a particular column block within that row of column blocks. The scanline address segment identifies a particular scanline within the column block. The pixel address segment identifies a specific pixel location within a scanline with a column block. An amount of measured coarse skew error is determined for each block in the spatially mapped array. The coarse skew error will be the same for all the blocks within a given column. An amount of measured fine skew error is determined for each pixel location in that column block. The measured fine skew error for a given pixel location is determined on a per-pixel basis. The amount of fine skew error will be the same for all pixel locations of each column block within the same column. A total skew error is generated for each pixel location in each column block. The coarse and fine skew error for a given pixel location in a column block may be zero. The total skew error for the current pixel location is stored in an array of total skew errors at a location in the array which is addressable as a function of the column address and pixel address segments of the address associated with that pixel location. In one embodiment, the function comprises a concatenation of the column and pixel address segments. The process repeats for all pixel locations of all column blocks. Thereafter, the array of total skew errors is provided to an electronic registration system wherein an electronic registration correction is performed on the digital image. The electronic registration system outputs a corrected pixel location which compensates for the skew error.

Various advantages will be apparent from the following more particular description, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a novel system and method for reducing a size of a memory buffer used by an electronic registration correction system performing an skew and bow error correction on a digital image.

Non-Limiting Definitions

An "image" refers to a pattern of physical light comprised of known colors of the light spectrum which are visible by the human eye. An image generally comprises a plurality of pixels.

Figure 1:
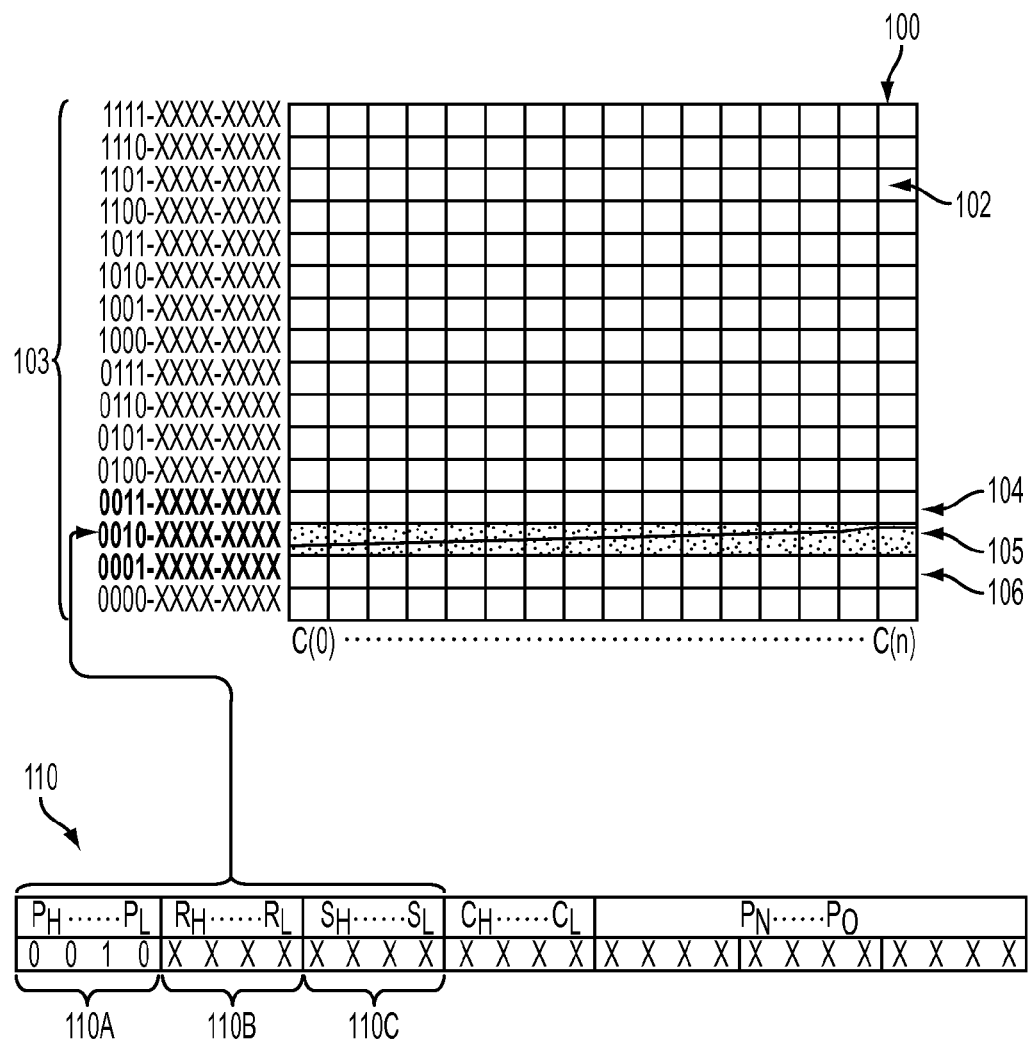
FIG. 1 illustrates an example full page of large blocks of image data in row/column format having a total skew error traversing row 105.

A "digital image" is an image which has been converted to a digitized form. One example full page of image data is shown in FIG. 1.

A "pixel", as used herein, refers to the smallest segment into which an image is divided. Pixels are arranged in a 2-dimensional array to form the digital image. The number of bits-per-pixel refers to a bit depth of that pixel. For example, a 32-bit pixel has a bit depth of 32. A 64-bit pixel has a bit depth of 64. The larger the bit depth, the more information that can be retained on a per-pixel basis.

A "spatially mapped array" is a 2-dimensional array, in row/column format, comprising rows of blocks of scanlines. One example 2-dimensional array is shown and discussed with respect to FIG. 1. A size of a block in the spatially mapped array is defined such that a maximum coarse skew error in that block is less than a number of rows of scanlines within that block.

The "next sequential address" is a next block residing in a same column within the spatially mapped array. A next sequentially addressed block can be either a column block having a higher address as the first column block or a lower address as the first column block. Next sequential addresses are shown in each of FIGS. 1-3.

A "scanline" represents one pass of a modulated beam along the bean scan trajectory. One scanline contains a single row of pixels. An example of a plurality of rows of scanlines is shown and discussed with respect to the embodiment of FIG. 3.

An "associated address", as used herein, refers to the address of each pixel of each scanline of each column block within the spatially mapped array. One example associated address for a given pixel location is associated address 110 of FIG. 1 shown comprising a plurality of address segments as will be discussed herein further in greater detail.

"Skew error" or ("beam scan trajectory error") occurs when scanlines of pixels drawn by a projected beam scan are distorted for a variety mechanisms determined to be contributors to distortions in the beam scan trajectory. Such distortions means that, without electronic correction of the digital image, the pixels of the image will be drawn by the beam scan at an angle ("skewed") relative to a line perpendicular to the edge of the photoreceptor surface whereon the modulated beam is projected. Skew error is often given as an amount of 'pixel displacement' along the beam scan trajectory. Each pixel can be adjusted by it's respective amount of displacement. The term 'skew error' is intended to include other beam scan trajectory errors such as, for instance, where the beam scan trajectory has deviated ("bow") from a straight line trajectory relative to an imaginary median of the photoreceptor surface.

"Coarse skew error" is the amount of coarse (or gross) skew error determined for each column block in the spatially mapped array on a per-block basis. The amount of coarse skew error for a given column block may be zero, i.e., the line of skew correction does not traverse this block. An example coarse skew error is shown traversing the rows of column blocks of FIG. 2.

"Fine skew error" is an amount of fine skew error measured for a pixel on a per-pixel basis. The amount of fine skew error may be zero. An example fine skew error is shown traversing the rows of scanlines in FIG. 3. Fine and coarse skew are typically measured in final test of the device or are determined in-situ during device set-up and/or configuration. Methods for measuring an amount of coarse and fine skew vary widely across differing devices and system architectures. Such methods are well established. As such, a discussion as to a particular method for determining the amount of coarse and fine skew for a given device or document reproduction system architecture is beyond the scope of this disclosure and has been omitted. Practitioners in this art, i.e., device designers, system engineers, technicians, and the like, would be sufficiently familiar with their own systems and devices, and the subsystems thereof, to know which of these introduce distortions in the beam scan trajectory and how to measure such distortions to within tight tolerances.

The "total skew error", as used herein, is a combination of the coarse skew error and the fine skew error. An example total skew error is shown traversing the array of FIG. 1.

An "array of total skew errors", according to various embodiments herein, is an array comprising a plurality of total skew errors determined for each pixel location within the spatially mapped array. One example array of total skew errors is shown at 400 and discussed herein further with respect to FIG. 4. Every pixel location within the spatially mapped array has an associated total skew error although for some pixel locations the coarse and fine skew may be zero.

A "buffer" is a memory or cache often of very high quality and very high speed. A processor will have a dedicated on-chip or on-board buffer for fast access to image data.

"Buffering" means storing to the buffer.

"Electronic registration correction" is a hardware and/or software process wherein pixels of an image are shifted such that measured distortions in the beam scan trajectory are corrected or are otherwise compensated for in the output image.

An "electronic registration system" is a hardware and/or software system capable of performing an electronic registration correction process. Such a system may comprise, in whole or in part, an ASIC, FPGA, or the like.

Example Full Page of Image Data

Reference is now being made to FIG. 1 which illustrates an example full page 100 of large blocks of image data. The page of image data comprises a spatially mapped array of individual large blocks 102 arrayed in row/column format. Each row of large blocks is addressable by a row address, collectively at 103. The number of row addresses is large enough to span the maximum skew of the imager. Although the example page of FIG. 1 is shown comprising n×m blocks, where n=m=16, it should be appreciated that each page may likely be of a size larger than the illustrated 16×16 array of large blocks.

Each row address comprises a sequence of address bits. The row address for the first row of large blocks at the bottom of the n×m array comprises the binary sequence: '0000-XXXX-XXXX', where 'X' is either a 1 or 0. The next sequential row 106 has starting row address: '0001-XXXX-XXXX'. The next sequential row 105, i.e., the row having the line of skew correction traversing therethrough, has starting row address: '0010-XXXX-XXXX'. The next sequential row 104 has starting row address: '0011-XXXX-XXXX'. Each starting row address comprises three address segments, a page address segment, a row address segment, and a scanline address segment. As is further discussed with respect to FIG. 2, the starting row address of each row, references a first row of column blocks within the row of large blocks.

The full address associated with row address 103 is shown at 110. The page address segment 110A has the first four bits of the row address of row 105. The bits of the page address segment are represented by the notation, $P_N \ldots P_0$, where N is the number of bits in the page address segment. Row address segment 110B has the second four bits of the row address of row 105. The bits of the row address segment are represented by the notation, $R_N \ldots R_0$, where N is the number of bits in the row address segment. The scanline address segment 110C has the last four bits of the row address of row 105. The bits of the scanline address segment are represented by the notation, $S_N \ldots S_0$, where N is the number of bits in the scanline address segment. Each of the page address, row address, and scanline address segments do not have to have the same number of bits.

Example Row of Column Blocks

Figure 2:
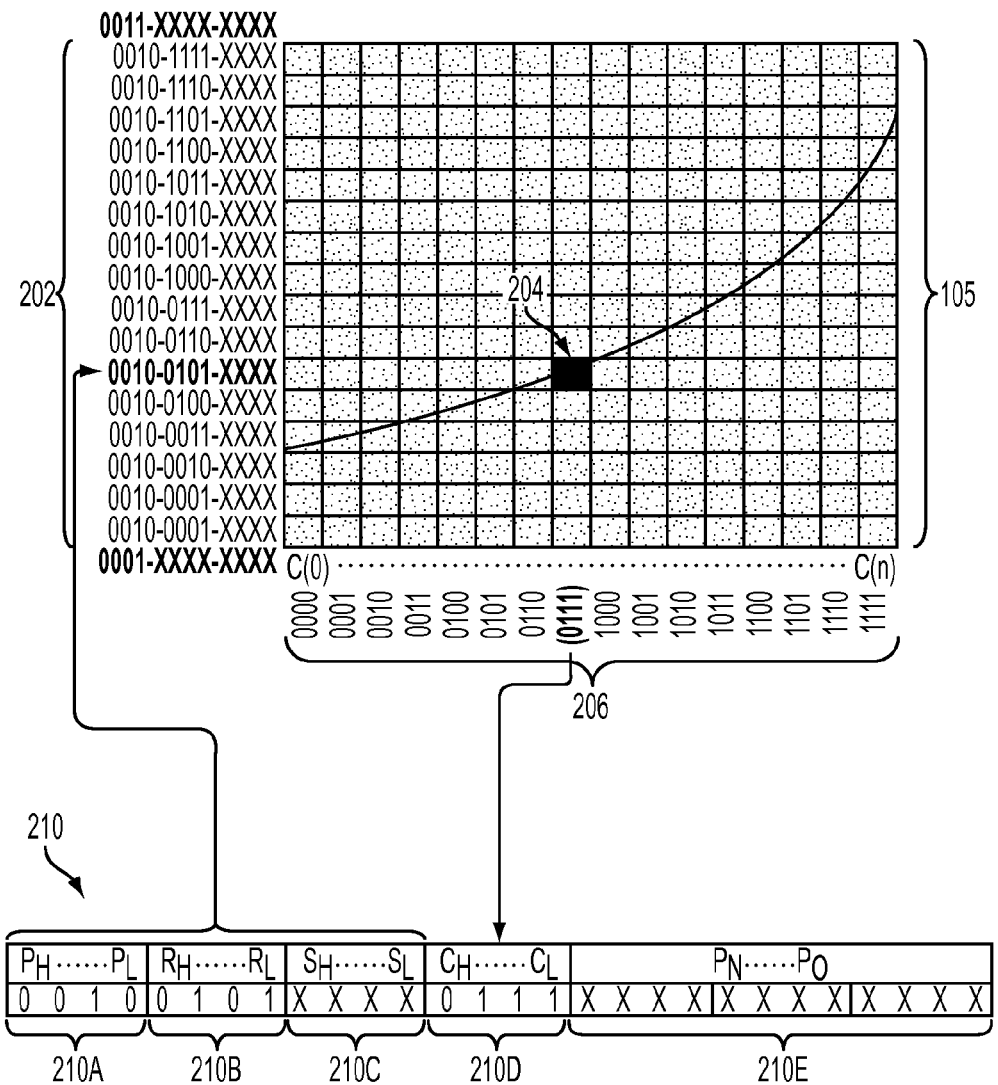
FIG. 2 illustrates the plurality of addressable rows of column blocks within row 105 of FIG. 1.

Reference is now made to FIG. 2 which further illustrates row 105 of FIG. 1. Row 105 comprises a plurality of rows of column blocks. All of the row addresses for all rows of column blocks in FIG. 2, collectively at 202, are sub-addresses of the row address of FIG. 1 associated with row 105. Thus, all the rows of column blocks of FIG. 2 reside within the single row 105 of the array of FIG. 1.

Each column block is identifiable within it's respective row of column blocks by an associated column offset, collectively at 206, represented by the notation C(0) . . . C(n), where n+1 is the number of blocks in a given row. The column offset is shown as a sequence of four bits. The column offset is a binary offset from the starting location of the first block pointed to by the row address for the particular row wherein the block resides. One of ordinary skill would appreciate that a binary offset can readily be applied to an address to obtain a second address. Each block residing within the same column within a given row has the same column offset.

Shown residing in column '0111' is block 204 having row address '0010-0101-XXXX'. Associated address 210 has the row address of block 204 in each of the page address segment 210A, the row address segment 210B, and the scanline address segment 210C. The column index for block 204 is stored in the column address segment 210D of associated address 210. The bits of the column address segment 210D of associated address 210 are represented by the notation, $C_N \ldots C_0$, where N is the number of bits in the column offset. Each block within row 105 comprises a plurality of scanlines. Each pixel location within a given scanline is addressable by pixel address segment 210E, as will next be described with respect to FIG. 3.

Example Rows of Scanlines of Pixel Locations

Figure 3:
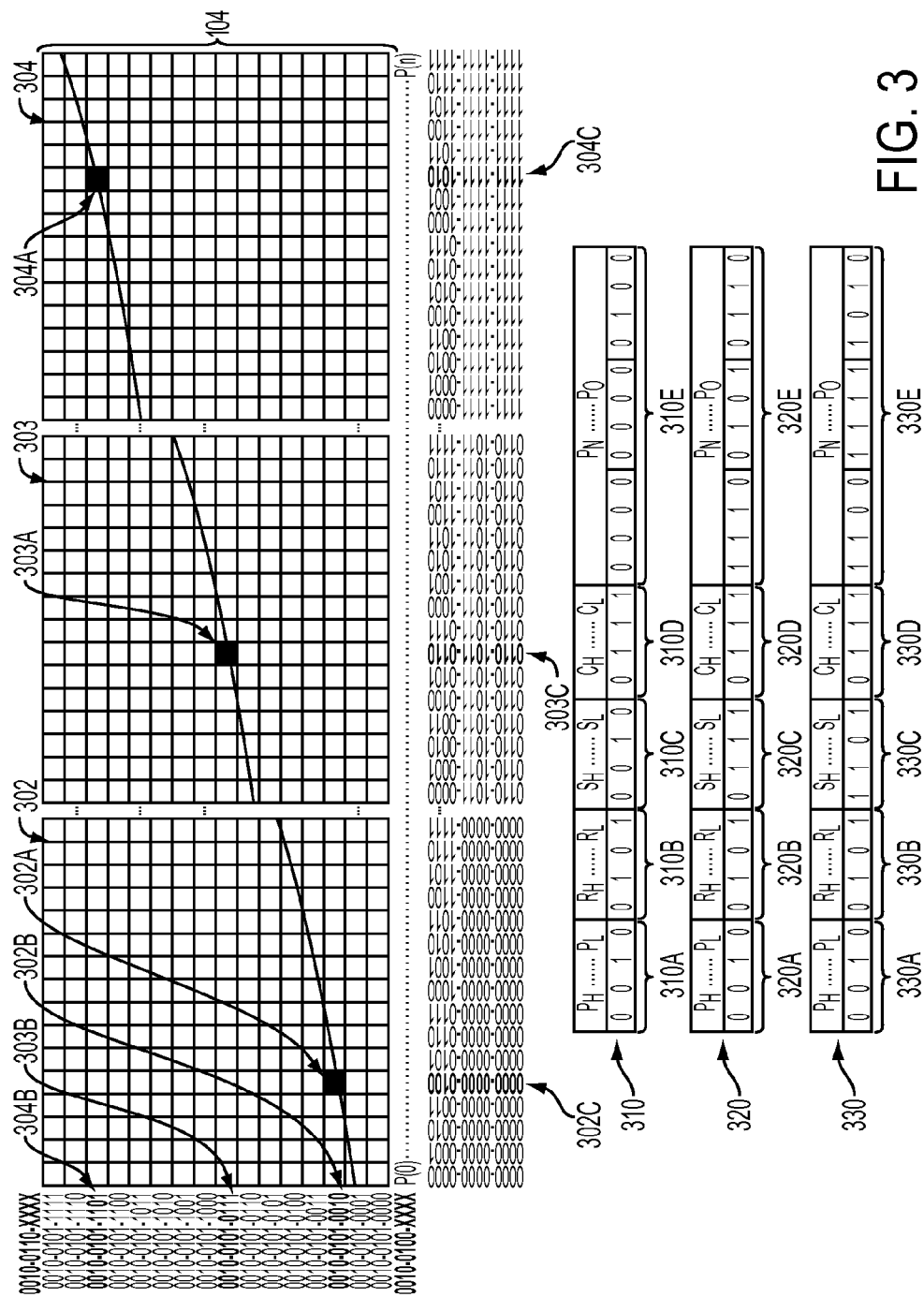
FIG. 3 illustrates an example plurality of addressable rows of scanlines within column block 204 of FIG. 2.

Reference is now being made to FIG. 3 which illustrates an example plurality of rows of scanlines within column block 204 of FIG. 2. Each scanline row has an associated row address. Each scanline comprises a plurality of pixel locations. Since the number of pixel locations within a given scanline row exceeds the width of a drawing sheet, the pixel locations of the rows of scanlines of FIG. 3 are shown comprising three separate sections 302, 303, and 304. Illustrated below the rows of scanlines are three associated addresses 310, 320, and 330, each associated with the pixel locations 302A, 303A, and 304A, respectively.

Pixel location 302A, which resides in section 302 of the rows of scanlines 104, has row address 302B given by the binary sequence: '0010-0101-0010'. Associated address 310 contains the first 4-bits of row address 302A in the page address segment 310A, the second 4-bits in row address segment 310B, and the last 4-bits of row address 302A are in the scanline address segment 310C. It should be appreciated that the scanline address segment differentiates this particular scanline from the other scanlines in row 104. Column address segment 310D contains the column offset '0111', which is the same column offset (at 210D) of block 204 of FIG. 2 because all the scanlines of FIG. 3 reside within column block 204. Pixel location 302A is identifiable within the scanline row 302B by pixel address offset: '0000-0000-0100' (at 302C). Pixel address offset 302C uniquely identifies pixel location 302A. This address portion is contained in pixel address segment 310E of associated address 310. It should be appreciated that associated address 310 uniquely identifies pixel location 302A within the array 100 of FIG. 1.

Residing in section 303 of the rows of scanlines 104, is pixel location 303A. The scanline row wherein pixel location 303A resides has row address 303B given by the binary sequence: '0010-0101-0111'. Associated address 320 contains the first 4-bits of row address 303A in the page address segment 320A, the second 4-bits in row address segment 320B, and the last 4-bits of row address 303A are in the scanline address segment 320C. Column address segment 320D contains the column offset '0111', which is the same column offset (at 210D) of block 204 of FIG. 2. Pixel location 303A is identifiable within scanline row 302B by pixel address offset: '0110-1011-0110' (at 303C). This address portion is contained in pixel address segment 320E of associated address 320. Associated address 320 uniquely identifies pixel location 303A within array 100 of FIG. 1.

Lastly, with respect to FIG. 3, residing in section 304 of row 104, is pixel location 304A. The scanline row wherein pixel location 304A resides has row address 304B given by the binary sequence: '0010-0101-1101'. Associated address 330 contains the first 4-bits of row address 304A in the page address segment 330A, the second 4-bits in row address segment 330B, and the last 4-bits of row address 304A are in the scanline address segment 330C. Column address segment 330D contains the same column offset of block 204 of FIG. 2. Pixel location 304A is identifiable within scanline row 303B by pixel address offset: '1111-1111-1010' (at 304C). This address portion is contained in pixel address segment 330E of associated address 330. Associated address 330 uniquely identifies pixel location 304A within array 100 of FIG. 1.

Each pixel location has an associated total skew error. Next will be discussed one example embodiment of an array of total skew errors which is addressable as a function of a pixel location's column address segment and pixel address segment.

Example Array of Total Skew Errors

Figure 4:
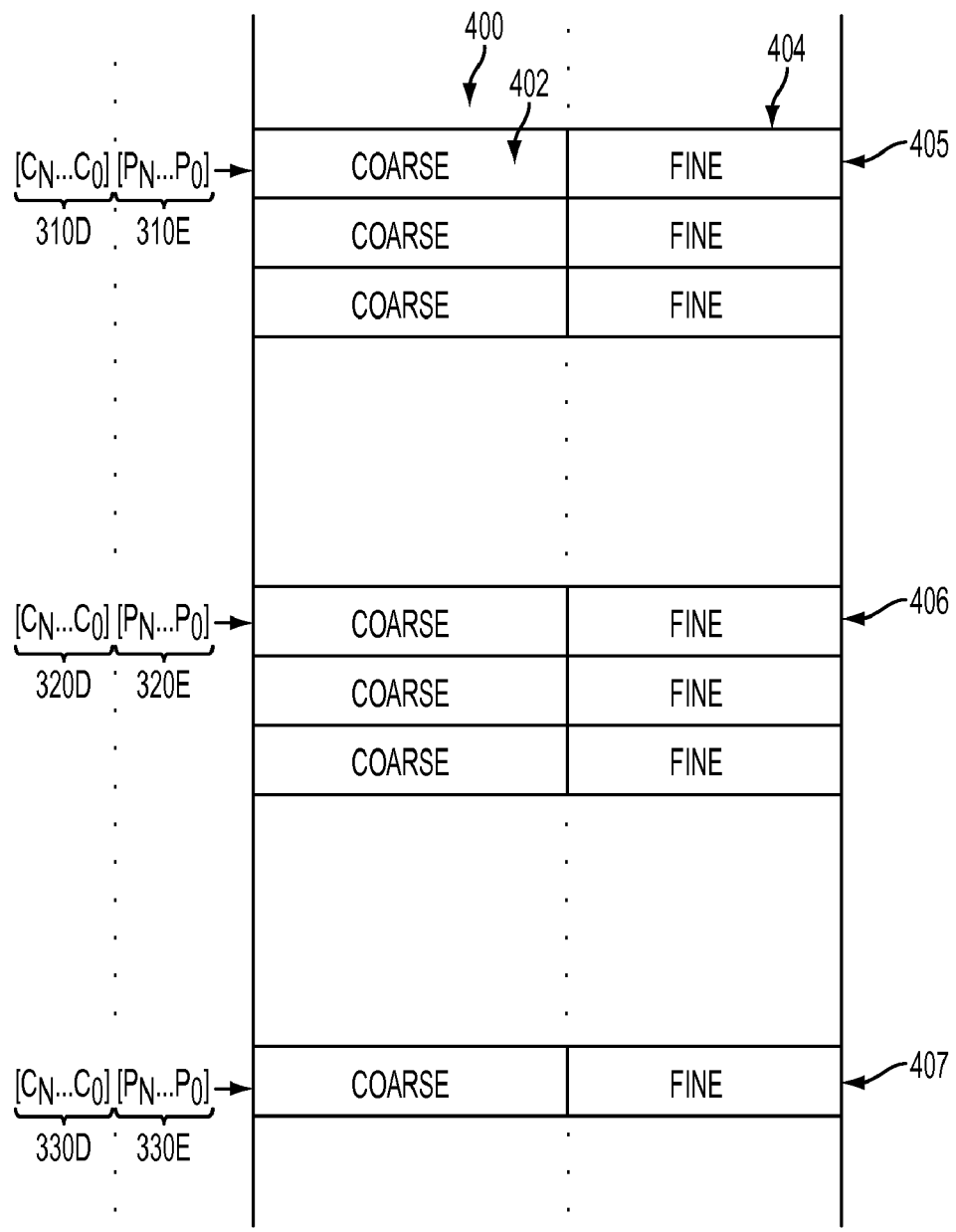
FIG. 4 illustrates an example array of total skews errors 400 addressable as a function of a given pixel location's associated column address segment and pixel address segment.

Reference is next being made to FIG. 4 which illustrates an example array of total skews errors 400 addressable as a function of a given pixel location's associated column address segment and pixel address segment. It should be appreciated that the total skew error for a given pixel location will be the same for all identical pixel locations of all blocks in the process direction (blocks within the same column) in the spatially mapped array. Each total skew error comprises a first and second bit sequence. In one embodiment, the first bit sequence of the total skew error contains the amount of coarse skew 402 determined, on a per-block basis, for the block wherein the pixel location resides. The second bit sequence of the total skew error contains the amount of fine skew 404 determined, on a per-pixel basis, for that pixel location. Each total skew error for each pixel location in the array 100 of FIG.

1, is pre-determined for a given system and saved in an array of total skew errors. The total skew error for a given pixel location is stored in the array of total skew errors as a function of the column address segment and pixel address segment of the pixel location's associated address. It should be appreciated that other embodiments of the array of total skew errors other than the illustrated linearly contiguous format are intended to fall within the scope of the appended claims.

For example, the total skew error determined for pixel location 302A of FIG. 3, is stored in the array 400 of total skew errors at array location 405 as a function of column address segment 310D and pixel address segment 310E of associated address 310. The total skew error determined for pixel location 303A of FIG. 3, is stored in the array of total skew errors 400 at array location 406 as a function of column address segment 320D and pixel address segment 320E of associated address 320. Likewise, the total skew error determined for pixel location 304A is stored in array 400 at location 407 as a function of the column address segment 330D and pixel address segment 330E of associated address 330.

In the embodiment of FIG. 4, the column address segment and pixel address segment are concatenated together to obtain a binary sequence of bits which, in turn, references a corresponding array location in the array of total skew errors 400. The binary sequence which references array location 405 is a combination of column address segment 310D, i.e., '0111' and pixel address segment 310E, i.e., '0000-0000-0100'. When concatenated together, these address segments form bit sequence: '0111-0000-0000-0100' which references array location 405. Similarly, the binary sequence which references array location 406 is a combination of column address segment 320D, i.e., '0111' and pixel address segment 320E, i.e., '1110-0101-0110'. When concatenated together, these two segments form bit sequence '0111-1110-0101-0110' which references array location 406. The bit sequence which references array location 407 is a combination of column address segment 330D and pixel address segment 330E. Together, these form the bit sequence: '0111-1100-1111-1010', which references array location 407. Alternative embodiments may take the form of, for example, the column address segment being concatenated onto the end of the pixel address segment. A mathematical function may be used to define a relationship which, given input values of at least the column address segment and pixel address segment of a given pixel location's associated address, outputs one or more values which, in turn, uniquely identify the total skew error (fine and coarse) in memory or storage for that pixel location. It should be appreciated that such other functions are intended to fall within the scope of the appended claims.

Example Flow Diagram of One Embodiment

Figure 5:
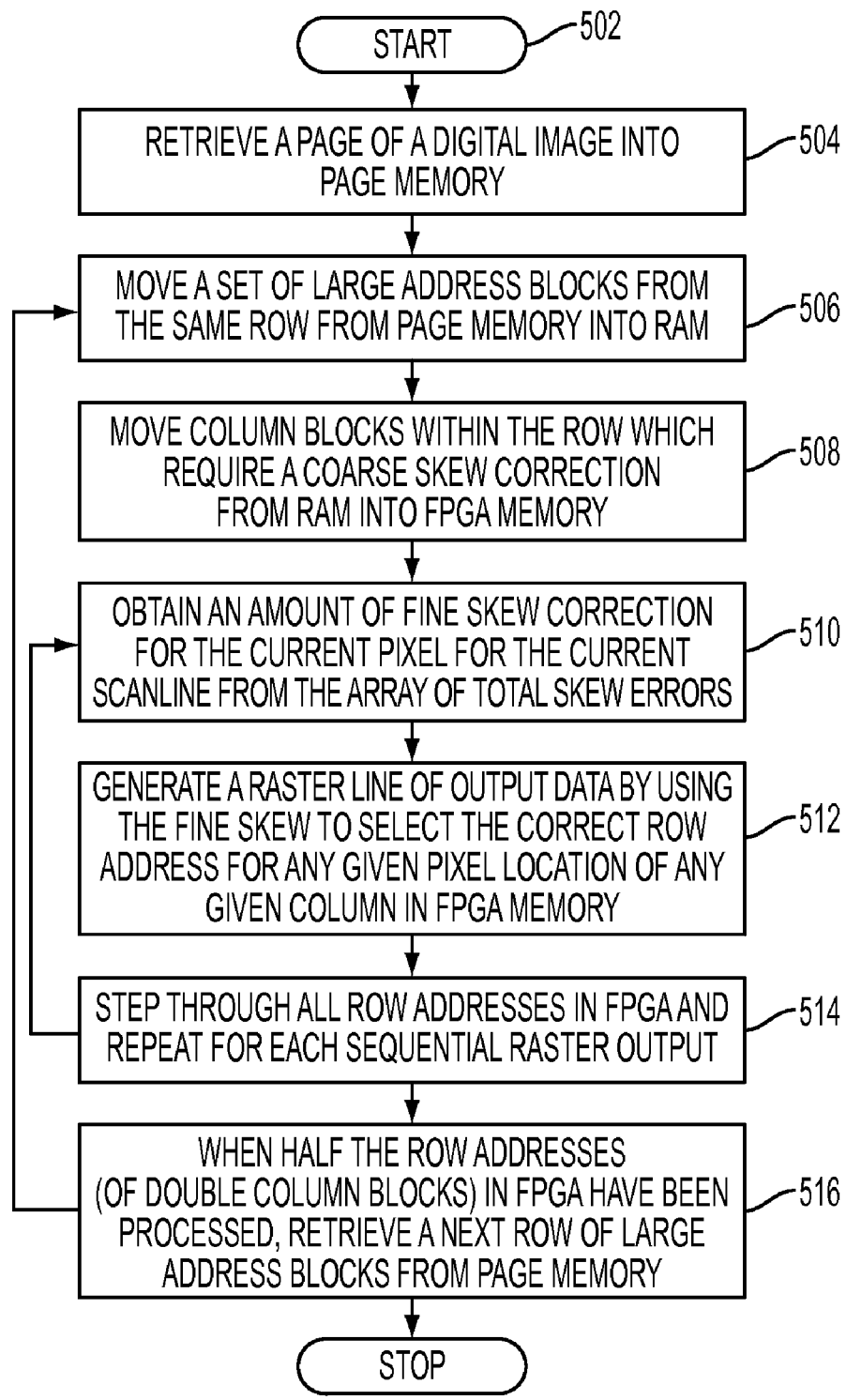
FIG. 5 is a flow diagram of one example embodiment for reducing buffer memory size requirements in an electronic registration system.

Reference is now made to the flow diagram of FIG. 5 which illustrates one example embodiment of the present method for reducing buffer memory size requirements in an electronic registration system. Flow processing starts at step 502 and immediately proceeds to step 504.

At step 504, retrieve a page of a digital image requiring electronic registration correction into page memory. The page, as shown by way of example in FIG. 1, may be retrieved from memory or storage or obtained from a system storing the page of image data in memory. The page comprises a spatially mapped array of large address blocks arranged in row/column format. An example page of large address blocks is shown in FIG. 1.

At step 506, a set of large address blocks from the same row are moved from page memory to RAM. One example row of large blocks is shown at 105 of FIG. 1.

At step 508, column blocks within the row of large blocks in RAM which require a coarse skew correction are moved from RAM into FPGA memory. It should be appreciated that moving a block from RAM into FPGA memory constitutes 'buffering' as defined herein. Once all column blocks have been moved into FPGA, the resulting set of blocks in FPGA will be coarse skew corrected by virtue of these blocks having been selected as a function of coarse skew.

At step 510, obtain the amount of measured fine skew error for the current pixel for the current scanline within the current column block in FPGA.

At step 512, generate a raster output line of data by using the fine skew to select the correct row address for any given pixel location of any given column. After sequencing through all columns and pixel locations and picking image data from the fine skew adjusted row, the resulting raster output line constructed will correct any skew in the imaging device or printer.

At step 514, step through all row addresses of the FPGA and apply step 510 for each sequential raster output.

At step 516, when half the row addresses (of double column blocks) in FPGA have been processed, bring the next column block from RAM into FPGA. When all the column blocks in RAM have been processed, retrieve a next row of large address blocks from page memory. This continual buffering and outputting of skew adjusted rasters is performed until all row addresses of page memory have been processed.

In such a manner, the amount of high speed expensive ER memory needed is effectively reduced. A reduction of $2^{n-1}$ is achievable, where n is the number of column address blocks. The greater the number of column blocks the less ER memory needed. However, there is a practical limitation to how small the ER buffer can be made because of the time needed to address the next block and other overhead such as the allowance for at least one line buffer at the start and end of each address block, if needed for ER algorithms. The programming of the FPGA needs to be performed in such a manner that some pipelining of address or data is done.

Figure 6:
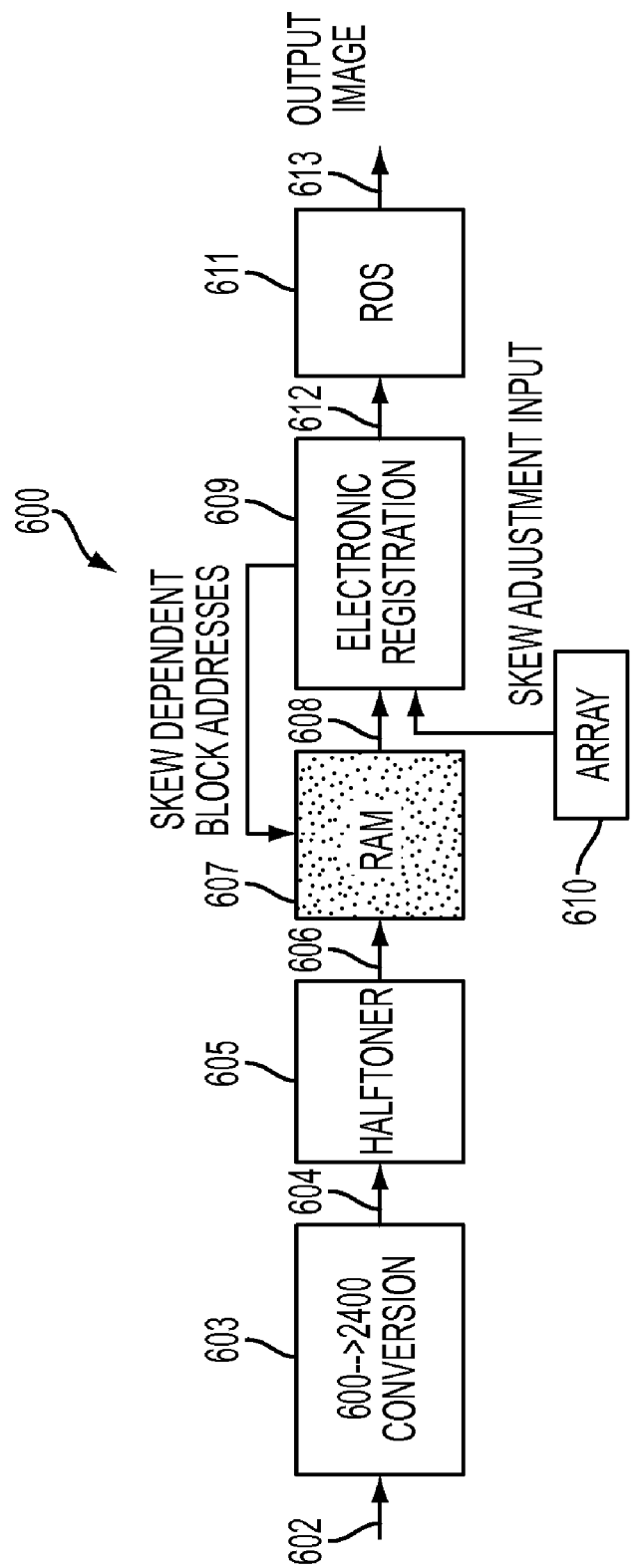
FIG. 6 illustrates one example embodiment of the present method wherein electronic registration correction is performed after halftoning.

Reference is now being made FIG. 6, which illustrates one example embodiment of the present method wherein electronic registration correction is performed after halftoning. Contone pixels 602 of an input image are provided to a converter module 603 which converts the contone pixels to high resolution contone pixels 604. In the embodiment shown, pixels at a resolution of 600 dots-per-inch (dpi) are converted to 2400 dpi. The high resolution contone pixels provided as output by converter 603 are provided as input to halftoner module 605 which, in turn, provides as output high resolution binary pixels 606 to RAM memory 607. Electronic registration system 609 references the array 610 of total skew errors, processed in a manner described above, to identify skew dependent blocks and retrieve image data 608 and from RAM 607. Only those blocks needed for skew correction are loaded into a high-speed buffer of electronic registration system 609 wherein pixel locations are adjusted by their determined amounts of fine skew correction. A corrected image 612 is provided to the Raster Output Scanner (ROS) 611 wherein an output image 613 is rendered.

Figure 7:
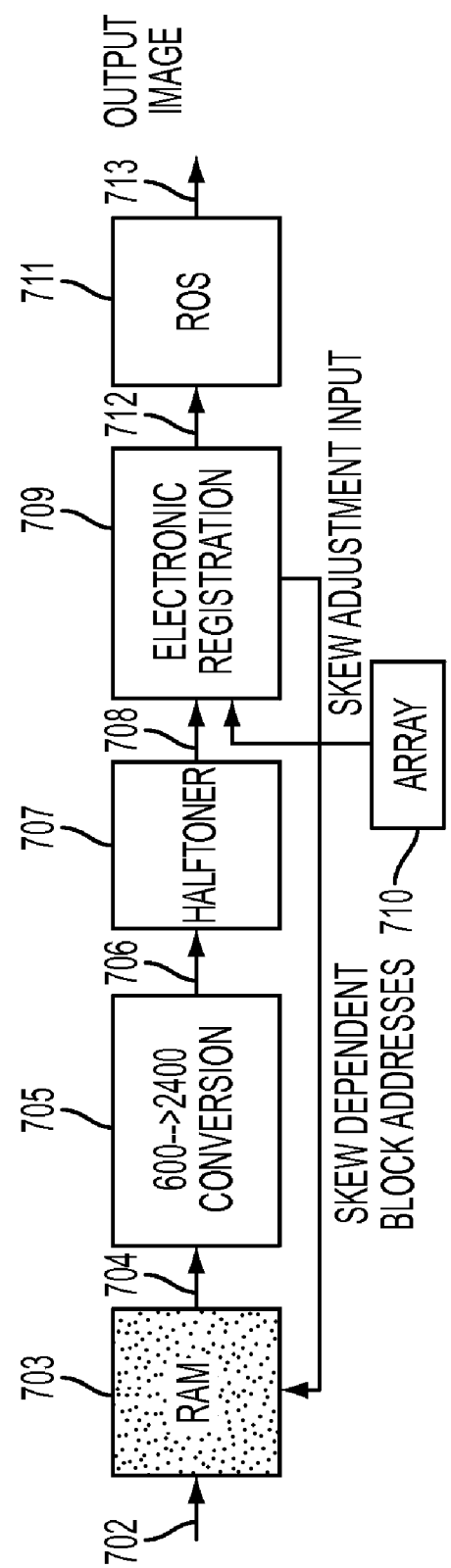
FIG. 7 illustrates another embodiment of the present method wherein electronic registration correction is performed prior to halftoning.

Reference is made to FIG. 7 which illustrates another embodiment of the present method wherein electronic registration correction is performed prior to halftoning. Contone pixels 702 of an input image are provided to RAM 703. The electronic registration system 709 identifies skew dependent blocks 704 in RAM. These image data are provided to converter module 705 wherein the contone pixels are converted to high resolution contone pixels 706. These, in turn, are provided to halftoner module 707 which provides high resolution binary pixels 708 to electronic registration system 709. The array of total skew errors 710 is provided as input to the electronic registration system such that pixels requiring fine skew correction can be adjusted to produce a skew corrected image 712 which, in turn, is provided as input to the ROS 711. The ROS provides a corrected image 713 as output.

Figure 9:
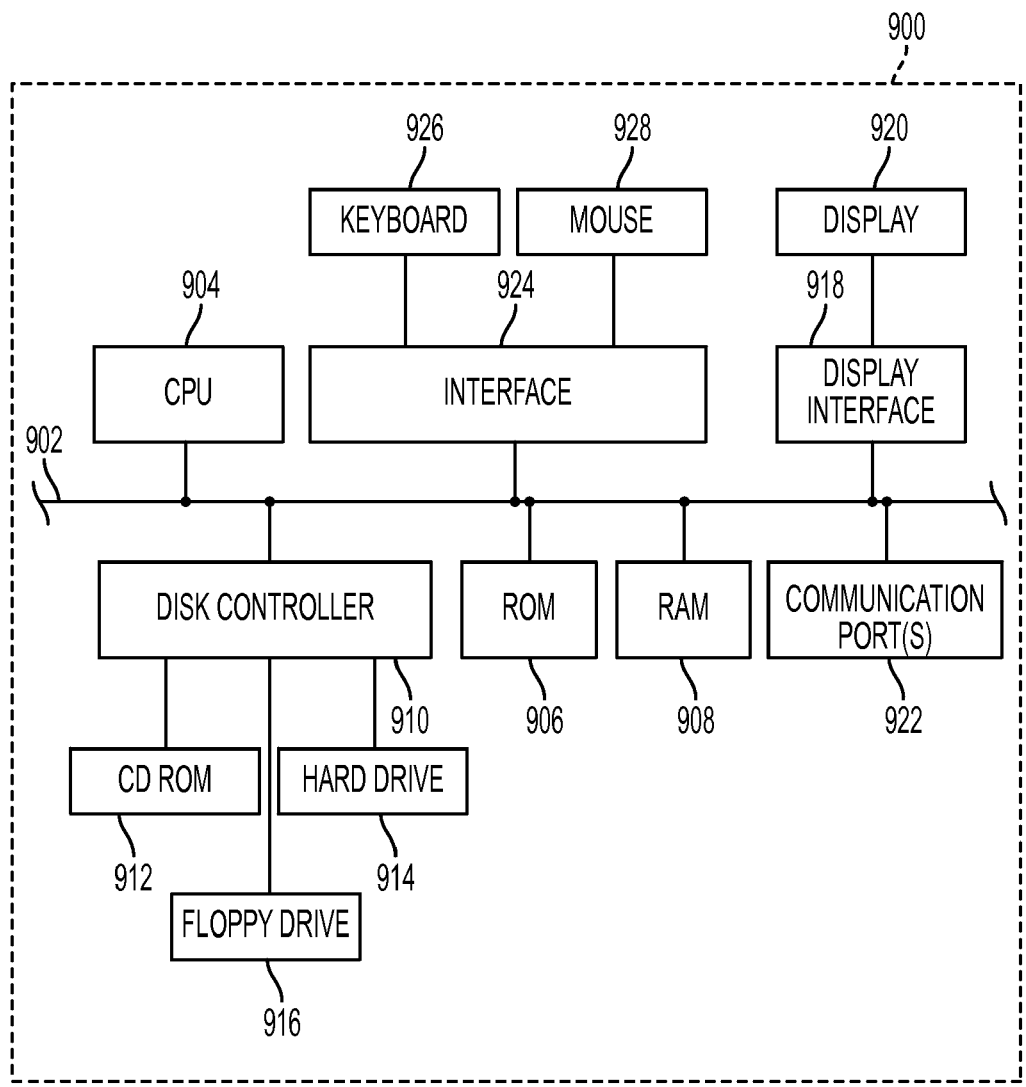
FIG. 9 illustrates a block diagram of one example embodiment of a special purpose computer system for performing one or more aspects of the present system and method as described with respect to the example flow diagram of FIG. 5 and the embodiments of FIGS. 6 and 7.

It should be appreciated that various modules of the schematic block diagrams of FIGS. 6 and 7 designate a system component which may comprise software and/or hardware designed to perform a specific function. A plurality of modules may collectively perform a function. A module may have specialized processor capable of reading machine executable program instructions. A module may comprise a single piece of hardware such as an ASIC, electronic circuit, or special purpose computer system such as is shown in FIG. 9. A plurality of modules may be executed by either a single special purpose computer system or a plurality of special purpose computer systems in parallel. Connections between modules includes both physical and logical connections. Modules may further include one or more software/hardware modules which may further comprise an operating system, drivers, device controllers, and other apparatuses some or all of which may be connected via a network.

Buffering of Next Sequentially Addressed Column Block

Figure 8:
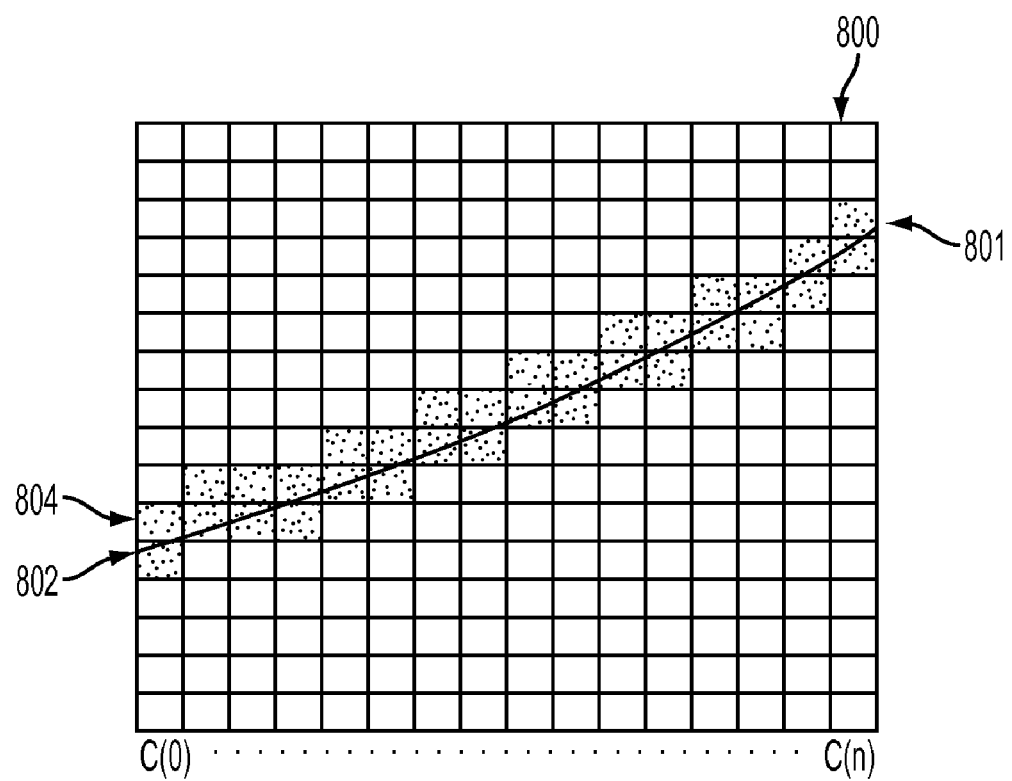
FIG. 8 illustrates an embodiment wherein a next column block is buffered in advance of completion of the electronic registration correction for the currently buffered column block in order to account for a cross-over of the coarse skew error from one column block to the next column block.

Reference is now being made to FIG. 8 which illustrates a next sequentially addressed column block in array 800. In order to account for a cross-over of the skew error from one block to the next, a next sequentially addressed column block 804 should be buffered in FPGA in advance of completion of processing the currently buffered column block 802. In such a manner, the electronic registration correction system has the second block already buffered.

Example Special Purpose Computer

Reference is now being made to FIG. 9 which illustrates a block diagram of one example embodiment of a special purpose computer system for performing one or more aspects of the present system and method as described with respect to the example flow diagram of FIG. 5 and the embodiments of FIGS. 6 and 7. Such a special purpose processor is capable of executing machine readable program instructions for carrying out one or more aspects of the present method and may comprise any of a micro-processor or micro-controller, ASIC, electronic circuit, or special purpose computer system. Such a system can be integrated, in whole or in part, with a xerographic system, color management system, image processing system, or any of a number of computing devices including those in a networked environment. All or portions of the flow diagram of FIG. 5 and the schematic block diagrams of FIGS. 6 and 7, as illustrated and described herein above, may be implemented partially or fully in hardware in conjunction with machine executable instructions in communication with various components of such a system. The special purpose computer incorporates a central processing unit (CPU) 904 capable of executing machine readable program instructions for performing any of the calculations, comparisons, logical operations, and other program instructions for performing the methods described above with respect to the flow diagrams and illustrated embodiments hereof. The CPU is in communication with Read Only Memory (ROM) 906 and Random Access Memory (RAM) 908 which, collectively, constitute example memory storage devices. Such memory may be used to store machine readable program instructions and other program data and results to sufficient to carry out any of the functionality described herein. Disk controller 910 interfaces with one or more storage devices 914. These storage devices may comprise external memory, zip drives, flash memory, USB drives, memory sticks, or other storage devices with removable media such as CD-ROM drive 912 and floppy drive 916. Machine executable program instructions execute the methods hereof or perform any of the functionality show with respect to the above-described embodiments. Computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein. Display interface 918 effectuates the display of information on display device 920 in various formats such as, for instance, audio, graphic, text, and the like. Interface 924 effectuates a communication via keyboard 926 and mouse 928. Such a graphical user interface is useful for a user to review any of the identified objects and for entering information in accordance with various embodiments hereof. Communication with external devices may occur using example communication port(s) 922. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports 922 are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

Example Single Pass Multi-Color Digital Print Device

Figure 10:
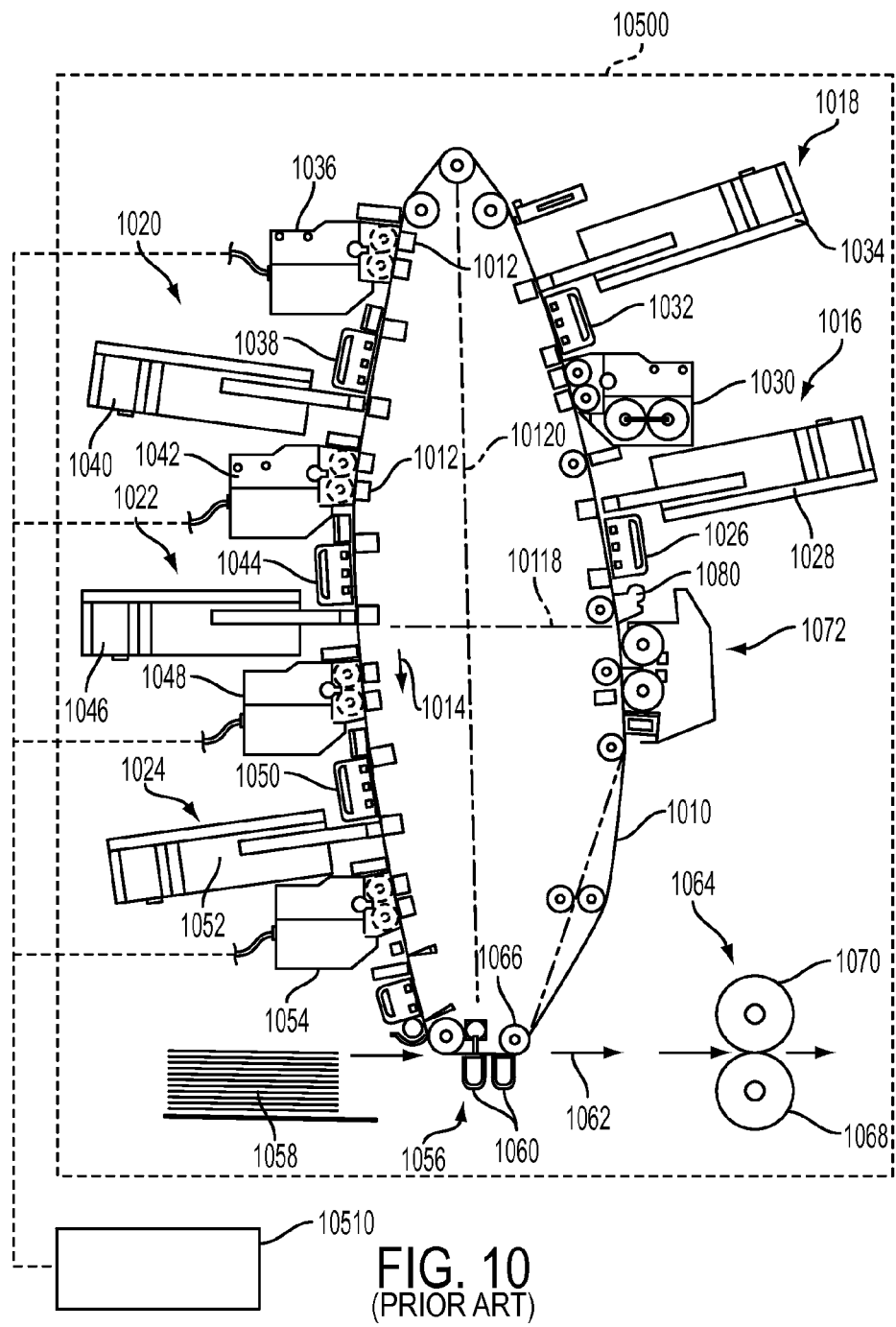
FIG. 10 is a prior art schematic illustration of single pass multi-color printing apparatus wherein various aspects of the present method as described with respect to the flow diagram of FIG. 5 and the embodiments of FIGS. 6 and 7 are likely to find their intended uses.
Figure 11A:
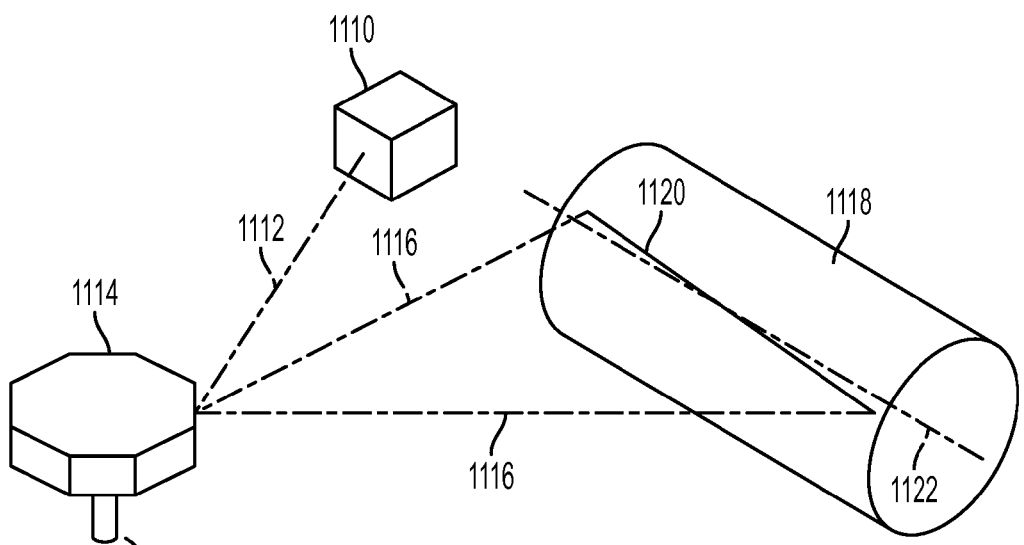
FIG. 11A is a partially simplified view of a scanning system, illustrating the problem of "skew" in prior art apparatus.
Figure 11B:
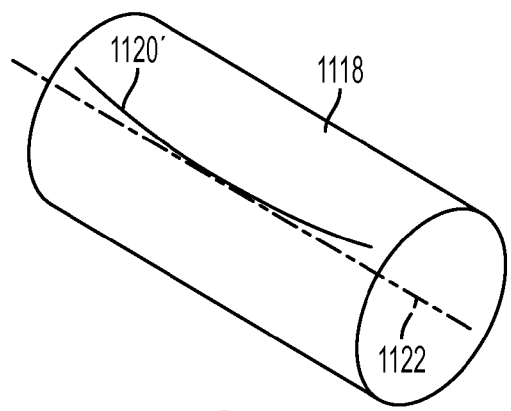
FIG. 11B is a simplified view of a portion of the apparatus shown in FIG. 11A, illustrating the problem of "bow" in prior art apparatus.

Reference is now being made to FIG. 10 is a prior art schematic illustration of single pass multi-color printing apparatus wherein various aspects of the present method as described with respect to the flow diagram of FIG. 5 and the embodiments of FIGS. 6 and 7 are likely to find their intended uses.

The printing machine of FIG. 10 employs an elliptically-shaped photoconductive belt 1010 supported by a plurality of rollers or bars 1012. The photoconductive belt is arranged in a vertical orientation and advances in the direction shown by arrow 1014 to move successive portions of the external surface of the photoconductive belt sequentially beneath the various processing stations disposed about the path of movement thereof. The photoconductive belt has a major axis 10120 and a minor axis 10118 aligned perpendicular to one another. The major axis is substantially parallel to the gravitational vector and arranged in a substantially vertical orientation. The minor axis is substantially perpendicular to the gravitational vector and arranged in a substantially horizontal direction.

The printing machine architecture of FIG. 10 incorporates five image recording stations. Initially, the photoconductive belt passes through image recording station 1016 which includes a charging device and an exposure device. The charging device includes a corona generator 1026 that charges the exterior surface of the photoconductive belt to a relatively high, substantially uniform potential. After the exterior surface of the photoconductive belt is charged, the charged portion thereof advances to an exposure device which includes a Raster Output Scanner (ROS) 1028. The ROS illuminates the charged portion of the exterior surface of the photoconductive belt to record a first electrostatic latent image thereon. Alternatively, a LED may be used. This first electrostatic latent image is developed by developer unit 1030 which deposits toner particles of a selected color on the first electrostatic latent image. After the highlight toner image has been developed on the exterior surface of the photoconductive belt, the photoconductive belt advances in the direction of arrow 1014 to image recording station 1018. Image recording station 1018 includes a recharging device and an exposure device. The charging device includes a corona generator 1032 which recharges the exterior surface of the photoconductive belt to a relatively high, substantially uniform potential. The exposure device includes a ROS 1034 which illuminates the charged portion of the exterior surface of the photoconductive belt selectively to record a second electrostatic latent image thereon. The second electrostatic latent image corresponds to the regions to be developed with magenta toner particles. This second electrostatic latent image is now advanced to the next successive developer unit 1036 which deposits magenta toner particles on the electrostatic latent image. In this way, a magenta toner powder image is formed on the exterior surface of the photoconductive belt. After the magenta toner powder image has been developed on the exterior surface of the photoconductive belt, the photoconductive belt advances in the direction of arrow 1014 to image recording station 1020. Image recording station 1020 includes a charging device and an exposure device. The charging device includes corona generator 1038 which recharges the photoconductive surface to a relatively high, substantially uniform potential. The exposure device includes ROS 1040 which illuminates the charged portion of the exterior surface of the photoconductive belt to selectively dissipate the charge thereon to record a third electrostatic latent image corresponding to the regions to be developed with yellow toner particles. This third electrostatic latent image is now advanced to the next successive developer unit 1042 which deposits yellow toner particles on the exterior surface of the photoconductive belt to form a yellow toner powder image thereon. After the third electrostatic latent image has been developed with yellow toner, the photoconductive belt advances in the direction of arrow 1014 to the next image recording station 1022. Image recording station 1022 includes a charging device and an exposure device. The charging device includes a corona generator 1044, which charges the exterior surface of the photoconductive belt to a relatively high, substantially uniform potential. The exposure device includes ROS 1046 which illuminates the charged portion of the exterior surface of the photoconductive belt to selectively dissipate the charge on the exterior surface of the photoconductive belt to record a fourth electrostatic latent image for development with cyan toner particles. After the fourth electrostatic latent image is recorded on the exterior surface of the photoconductive belt, the photoconductive belt advances this electrostatic latent image to the cyan developer unit 1048 which deposits cyan toner particles on the fourth electrostatic latent image. These toner particles may be partially in superimposed registration with the previously formed powder image. After the cyan toner powder image is formed on the exterior surface of the photoconductive belt, the photoconductive belt advances to the next image recording station 1024. Image recording station 1024 includes a charging device and an exposure device. The charging device includes corona generator 1050 which charges the exterior surface of the photoconductive belt to a relatively high, substantially uniform potential. The exposure device includes ROS 1052 which illuminates the charged portion of the exterior surface of the photoconductive belt to selectively discharge those portions of the charged exterior surface of the photoconductive belt which are to be developed with black toner particles. The fifth electrostatic latent image, to be developed with black toner particles, is advanced to black developer unit 1054. At black developer unit 1054, black toner particles are deposited on the exterior surface of the photoconductive belt. These black toner particles form a black toner powder image which may be partially or totally in superimposed registration with the previously formed toner powder images. In this way, a multi-color toner powder image is formed on the exterior surface of the photoconductive belt. Thereafter, the photoconductive belt advances the multi-color toner powder image to a transfer station, indicated generally by the reference numeral 1056. At transfer station 1056, a receiving medium, i.e., paper, is advanced from stack 1058 by sheet feeders and guided to transfer station 1056. At transfer station 1056, a corona generating device 1060 sprays ions onto the backside of the paper. This attracts the developed multi-color toner image from the exterior surface of the photoconductive belt to the sheet of paper. Stripping assist roller 1066 contacts the interior surface of the photoconductive belt and provides a sufficiently sharp bend thereat so that the beam strength of the advancing paper strips from the photoconductive belt. A vacuum transport moves the sheet of paper in the direction of arrow 1062 to fusing station 1064. Fusing station 1064 includes a heated fuser roller 1070 and a back-up roller 1068. The back-up roller 1068 is resiliently urged into engagement with the fuser roller 1070 to form a nip through which the sheet of paper passes. In the fusing operation, the toner particles coalesce with one another and bond to the sheet in image configuration, forming a multi-color image thereon. After fusing, the finished sheet is discharged to a finishing station where the sheets are compiled and formed into sets which may be bound to one another. These sets are then advanced to a catch tray for subsequent removal therefrom by the printing machine operator.

One skilled in the art will appreciate that while the multi-color developed image has been disclosed as being transferred to paper, it may be transferred to an intermediate member, such as a belt or drum, and then subsequently transferred and fused to the paper. Furthermore, while toner powder images and toner particles have been disclosed herein, one skilled in the art will appreciate that a liquid developer material employing toner particles in a liquid carrier may also be used. Invariably, after the multi-color toner powder image has been transferred to the sheet of paper, residual toner particles remain adhering to the exterior surface of the photoconductive belt.

The photoconductive belt moves over isolation roller 1078 which isolates the cleaning operation at cleaning station 1072 wherein residual toner particles are removed from the photoconductive belt. The photoconductive belt then moves under spots blade 1080 to also remove toner particles therefrom. Environmental conditioning unit 10510 maintains the printing machine components enclosed in enclosure 10500 at a pre-defined temperature and humidity.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for electronic registration correction comprising:

receiving, in a memory, a page of a digital image comprising a spatially mapped array of large address blocks arranged in row/column format, each of said large address blocks comprising rows of column blocks comprising rows of scanlines comprising a row of pixel locations, wherein each pixel location has an associated address comprising a page address segment identifying a row of large address blocks in said spatially mapped array, a row address segment identifying a row of column blocks within a row of large address blocks, a column address segment identifying a column block within a row of column blocks, a scanline address segment identifying a scanline within said column block, and a pixel address segment identifying a pixel location within said scanline;

receiving an array of total skew errors, each pixel location of each scanline in said spatially mapped having an associated total skew error, a each total skew error in said array comprising a first and second sequence of bits, said first bit sequence containing a measured fine skew, and said second bit sequence containing a measured coarse skew for the column block wherein that pixel resides, each total skew error in said array of total skew errors being addressable as a function of said column address segment and pixel address segment of the address associated with that pixel location;

selecting a set of large address blocks within a same row of said spatially mapped array and moving said selected large address blocks from page memory into RAM, said set of large address blocks having been selected as a function of a selected pixel within any of said large address blocks using said page address segment of said selected pixel's associated address;

selecting a set of column blocks within said row of large address blocks which require a coarse skew correction and moving said selected set of column blocks from RAM into FPGA memory, said column blocks having been selected as a function of said selected pixel's row address segment, having moved said column blocks from RAM into FPGA resulting in said blocks in FPGA having been coarse skew corrected by virtue of these column blocks having been selected as a function of coarse skew; and for each pixel location of each scanline of each row address of each column block in FPGA memory:

retrieving an amount of measured fine skew for the current pixel for the current scanline within the current column block, said amount of measured fine skew being retrieved from said array of total skew errors using the current pixel location's column address segment and pixel address segment to reference the total skew error for the current pixel location in said array of total skew errors and applying an amount of correction which compensates for said retrieved amount of fine skew error associated with the current pixel; and generating a raster output line of skew corrected data.

2. The method of claim 1, wherein, in response to half of all of said row addresses in FPGA have been processed, selecting a next set of column blocks and moving said selected next set of column blocks from RAM into FPGA memory.

3. The method of claim 1, wherein, in response to all column blocks in RAM having been processed, selecting a next set of large address blocks from a next row in page memory and moving said selected next set of large address blocks from page memory into RAM.

4. The method of claim 1, wherein, in order to account for a cross-over of a coarse skew from one column block to a next column block, further comprising:
   selecting a next sequentially addressed column block from said set of column blocks in RAM; and
   moving said selected next column block from RAM into FPGA memory.

5. The method of claim 4, wherein said next column block is buffered in said FPGA memory in advance of completion of processing the current column block in FGPA memory.

6. The method of claim 1, wherein said function of said column address segment and said pixel address segment comprises a concatenation of said pixel address segment and said column address segment.

7. The method of claim 1, wherein a size of a given column block being defined such that a maximum coarse skew error in the block is less than a number of rows of scanlines within that block.

8. A system for performing an electronic registration correction, the system comprising:
   a memory storing a page of a digital image comprising a spatially mapped array of large address blocks arranged in row/column format, each of said large address blocks comprising rows of column blocks comprising rows of scanlines comprising a row of pixel locations, wherein each pixel location has an associated address comprising a page address segment identifying a row of large address blocks in said spatially mapped array, a row address segment identifying a row of column blocks within a row of large address blocks, a column address segment identifying a column block within a row of column blocks, a scanline address segment identifying a scanline within said column block, and a pixel address segment identifying a pixel location within said scanline;
   a storage device; and
   a processor in communication with said storage device and said memory, said processor executing machine readable instructions for performing the method of:
      receiving an array of total skew errors, each pixel location of each scanline in said spatially mapped having an associated total skew error, a each total skew error in said array comprising a first and second sequence of bits, said first bit sequence containing a measured fine skew, and said second bit sequence containing a measured coarse skew for the column block wherein that pixel resides, each total skew error in said array of total skew errors being addressable as a function of said column address segment and pixel address segment of the address associated with that pixel location;
      selecting a set of large address blocks within a same row of said spatially mapped array and moving said selected large address blocks from page memory into RAM, said set of large address blocks having been selected as a function of a selected pixel within any of said large address blocks using said page address segment of said selected pixel's associated address;
      selecting a set of column blocks within said row of large address blocks which require a coarse skew correction and moving said selected set of column blocks from RAM into FPGA memory, said column blocks having been selected as a function of said selected pixel's row address segment, having moved said column blocks from RAM into FPGA resulting in said blocks in FPGA having been coarse skew corrected by virtue of these column blocks having been selected as a function of coarse skew; and
      for each pixel location of each scanline of each row address of each column block in FPGA memory:
         retrieving an amount of measured fine skew for the current pixel for the current scanline within the current column block, said amount of measured fine skew being retrieved from said array of total skew errors using the current pixel location's column address segment and pixel address segment to reference the total skew error for the current pixel location in said array of total skew errors and applying an amount of correction which compensates for said retrieved amount of fine skew error associated with the current pixel; and
         generating a raster output line of skew corrected data.

9. The system of claim 8, wherein, in response to half of all of said row addresses in FPGA have been processed, selecting a next set of column blocks and moving said selected next set of column blocks from RAM into FPGA memory.

10. The system of claim 8, wherein, in response to all column blocks in RAM having been processed, selecting a next set of large address blocks from a next row in page memory and moving said selected next set of large address blocks from page memory into RAM.

11. The system of claim 8, wherein, in order to account for a cross-over of a coarse skew from one column block to a next column block, further comprising:
   selecting a next sequentially addressed column block from said set of column blocks in RAM; and
   moving said selected next column block from RAM into FPGA memory.

12. The system of claim 11, wherein said next column block is buffered in said FPGA memory in advance of completion of processing the current column block in FGPA memory.

13. The system of claim 8, wherein said function of said column address segment and said pixel address segment comprises a concatenation of said pixel address segment and said column address segment.

14. The system of claim 8, wherein a size of a given column block being defined such that a maximum coarse skew error in the block is less than a number of rows of scanlines within that block.

* * * * *